(No Model.)

F. P. CAMPBELL.
ADJUSTABLE EAVES TROUGH BRACKET.

No. 288,307.                     Patented Nov. 13, 1883.

WITNESSES:

INVENTOR:
F. P. Campbell
BY Munn & Co
ATTORNEYS.

UNITED STATES PATENT OFFICE.

FRANKLIN P. CAMPBELL, OF BLOOMFIELD, NEW JERSEY, ASSIGNOR TO HIMSELF AND THOMAS E. HAYES, OF SAME PLACE.

ADJUSTABLE EAVES-TROUGH BRACKET.

SPECIFICATION forming part of Letters Patent No. 288,307, dated November 13, 1883.

Application filed March 5, 1883. (No model.)

*To all whom it may concern:*

Be it known that I, FRANKLIN P. CAMPBELL, of Bloomfield, in the county of Essex and State of New Jersey, have invented certain new and useful Improvements in Adjustable Eaves-Trough Brackets, of which the following is a full, clear, and exact description.

Reference is to be had to the accompanying drawings, forming part of this specification, in which similar letters of reference indicate corresponding parts in both the figures.

Figure 1:
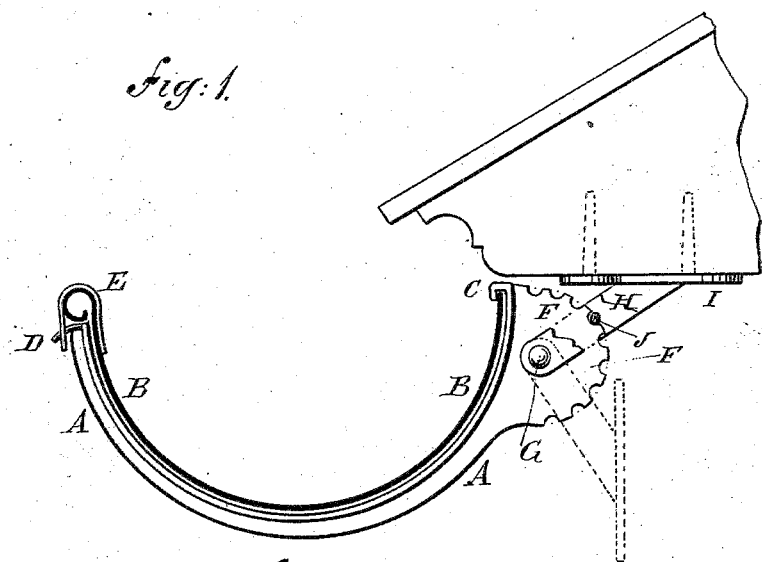
Figure 2:
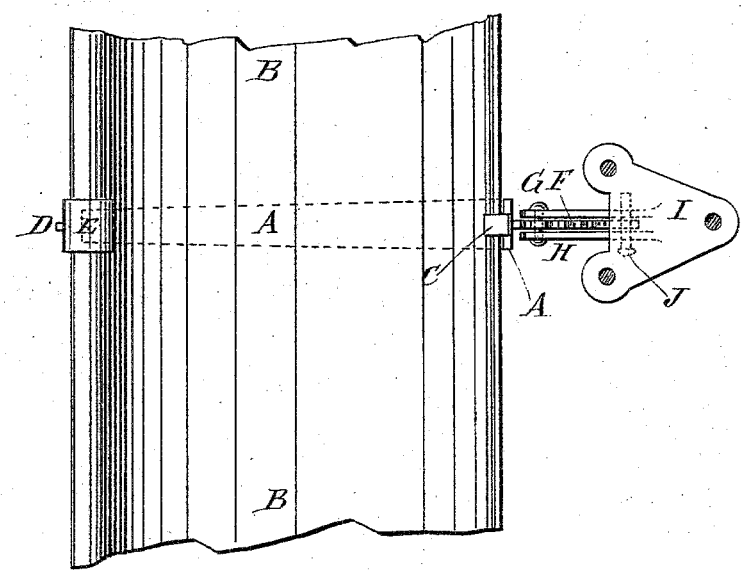

Figure 1 is a side elevation of my improvement, illustrating its use. Fig. 2 is a plan view of the same.

The object of this invention is to facilitate the attachment of eaves-trough brackets to buildings.

The invention consists in an eaves-trough bracket constructed with a trough-holding arm having a toothed segment upon its inner end, and which is connected with a slotted shank by a pivoting-rivet passing through the center of the segment, and a locking-rivet passing between the teeth of the said segment, so that the said shank and arm can be adjusted at any desired angle, as will be hereinafter fully described.

A represents the arm or trough-holder of the bracket, the upper side of which is concaved to receive and fit upon the eaves-trough B.

Upon the inner end of the upper side of the holder A is formed a hook, C, to receive the edge of the trough B.

Upon the outer end of the holder A is formed a point, D, to receive the end of a short metal strip, E, which is bent over and soldered to the outer edge of the trough B.

Upon the rear side of the inner end of the arm or trough-holder A is formed the segment F of a gear-wheel, which is perforated at its center to receive the rivet G. The rivet G also passes through the slotted end of the shank or standard H, upon the other end of which is formed a base-plate or foot, I, which is placed at an angle with the length of the shank H, and has a number of holes formed through it to receive the nails or screws by which the bracket is secured to its support.

In the slotted shank H is formed a hole to receive a pin, nail, or rivet, J, the said hole being in such a position that the said pin, nail, or rivet J will engage with the teeth of the segment F, and thus rigidly connect the said holder and shank. With this construction the shank H can be adjusted for its foot I to rest against a horizontal, a vertical, or an inclined support while holding the arm A in proper position to receive the eaves-trough, and can then be secured in place by inserting the pin or rivet J. The bracket can then be secured to its support with the same facility as an ordinary bracket.

Having thus described my invention, what I claim as new, and desire to secure by Letters Patent, is—

In an eaves-trough bracket, the combination, with the trough-holding arm A, having toothed segment F, of the slotted shank H, the pivoting-rivet G, and the locking-rivet J, substantially as herein shown and described, whereby the said shank and arm can be adjusted at any required angle, as set forth.

FRANKLIN P. CAMPBELL.

Witnesses:
JAMES T. GRAHAM,
C. SEDGWICK.